(12) United States Patent
Grasser

(10) Patent No.: US 10,983,360 B2
(45) Date of Patent: Apr. 20, 2021

(54) OPTICAL DEVICE ABLE TO CHANGE THE DIRECTION OF PROPAGATION OF A LIGHT BEAM

(71) Applicant: COMPAGNIE INDUSTRIELLE DES LASERS CILA, Orléans (FR)

(72) Inventor: Régis Grasser, Olivet (FR)

(73) Assignee: COMPAGNIE INDUSTRIELLE DES LASERS CILAS, Orleans (FR)

( * ) Notice: Subject to any disclaimer, the term of this patent is extended or adjusted under 35 U.S.C. 154(b) by 295 days.

(21) Appl. No.: 15/939,146

(22) Filed: Mar. 28, 2018

(65) Prior Publication Data

US 2018/0284461 A1  Oct. 4, 2018

(30) Foreign Application Priority Data

Mar. 28, 2017  (FR) ...................................... 1700332

(51) Int. Cl.
| | |
|---|---|
| G02B 26/08 | (2006.01) |
| G02B 26/10 | (2006.01) |
| G02B 26/12 | (2006.01) |
| G02B 27/09 | (2006.01) |
| G02B 27/30 | (2006.01) |
| G02B 27/64 | (2006.01) |
| F41G 3/14 | (2006.01) |

(52) U.S. Cl.
CPC ..... *G02B 27/0955* (2013.01); *G02B 26/0875* (2013.01); *G02B 26/101* (2013.01); *G02B 27/0972* (2013.01); *G02B 27/30* (2013.01); *G02B 27/648* (2013.01); *F41G 3/145* (2013.01)

(58) Field of Classification Search
CPC ......... G01C 15/00; H01S 3/101; G02B 27/64; G02B 27/0955; G02B 27/0972; G02B 27/30; G02B 27/648; G02B 26/0875; G02B 26/101; F41G 3/145
USPC ....................................................... 359/210.1
See application file for complete search history.

(56) References Cited

U.S. PATENT DOCUMENTS 7,538,948 B2 *  5/2009  Muenz ............... B23K 26/0604
                                                     359/618
2011/0280018 A1  11/2011  Vissenberg et al.

FOREIGN PATENT DOCUMENTS

WO       2009062957 A1    5/2009

* cited by examiner

*Primary Examiner* — William R Alexander
*Assistant Examiner* — Tamara Y. Washington
(74) *Attorney, Agent, or Firm* — Christensen O'Connor Johnson Kindness PLLC

(57) ABSTRACT

An optical device able to change the direction of propagation of a light beam. The optical device allows a wide range of adjustment of the direction of the light beam, said optical device including, in the direction of propagation of the light beam, an overall divergent group of lenses and an overall convergent group of lenses. The overall divergent group of lenses contains, in the direction of propagation of the light beam, a fixed lens, and an optical module comprising at least one movable optical element able to change the direction of propagation of the light beam emerging from the overall divergent group of lenses.

18 Claims, 2 Drawing Sheets

OPTICAL DEVICE ABLE TO CHANGE THE DIRECTION OF PROPAGATION OF A LIGHT BEAM

CROSS-REFERENCE TO RELATED APPLICATION

This application claims the benefit of French Patent Application No. 1700332, filed Mar. 28, 2017, which is incorporated herein by reference in its entirety.

TECHNICAL FIELD

The present invention relates to the field of the formation of light beams and, more particularly, an optical device able to change the direction of a light beam.

BACKGROUND

A light beam such as a laser beam is generally produced in a laser cavity. Most of the time, this light beam must pass through optical beam-formation units in order to obtain characteristics that are suitable for the application for which the beam is used.

Generally, the beam-formation units are collimators and beam expanders (or enlargers). For collimators, the divergent light beam is formed by the collimator to concentrate its energy at a point on a distant target. For beam expanders, the collimated light beam is transformed by the beam expander into another collimated light beam with a different divergence.

Both for a collimator and for a beam expander, the distance between the beam emitter and the target that the beam must reach is generally more than hundreds of meters. Moreover, the target is often very small. Precise control of the beam is therefore necessary to keep the beam on the target for a time from some seconds to some minutes.

Laser marking is a typical application of beam expanders. The aim of laser marking is to mark an object with a light dot to designate it as the target. The accuracy of laser pointing is therefore crucial for fixing the correct target.

Several techniques already exist for controlling the direction of a light beam.

There are the techniques that use a tip-tilt mirror, on which the beam can be reflected. We may also encounter techniques using prismatic windows ("wedged windows") or optical materials sensitive to electromagnetic fields. However, these techniques employ optomechanical components that are added onto the exterior of the expander.

Document WO 2009/062957 proposes an optical system allowing control of the direction of a laser beam emitted by a laser source. This system comprises an expander, of the Galilean telescope type, which contains, in the direction of propagation of the laser beam, an overall divergent first group of lenses and an overall convergent second group of lenses. The direction of the laser beam leaving the expander can be modified by displacing one of the groups of lenses, notably the overall divergent group of lenses. However, a reasonable adjustment of the direction of the laser beam requires large displacements of one of the groups of lenses. If there are limited possibilities for displacement of the group of lenses in question, the range of adjustment of the direction of the laser beam will consequently be very limited.

SUMMARY

The present invention aims to overcome this drawback by making it possible to obtain a wide range of adjustment without having to displace optics over large distances.

For this purpose, the invention relates to an optical device that is able to change the direction of propagation of a light beam comprising, in the direction of propagation of the light beam, an overall divergent group of lenses and an overall convergent group of lenses.

According to the invention, the overall divergent group of lenses contains, in the direction of propagation of the light beam:

a fixed lens, and an optical module comprising at least one movable optical element able to change the direction of propagation of the light beam emerging from the overall divergent group of lenses.

Thus, owing to the movable optical element of the optical module, it is possible to modify the direction of the light beam leaving the optical device. This gives advantages in terms of speed for changing the direction of the light beam and in terms of bandwidth. It is then possible to stabilize the direction of a laser beam in order to point at a target without needing a support for holding the source of the light beam.

Moreover, the optical module comprises a displacement unit configured to displace the movable optical element as a function of signals representing a set direction of propagation of the light beam at the output of the optical device.

According to a first embodiment:

the fixed lens corresponds to a fixed converging lens, and the movable optical element comprises a diverging lens that can be displaced in a plane approximately perpendicular to the direction of propagation of the light beam.

According to a particular feature, the displacement unit is able to displace the diverging lens in the plane perpendicular to the axis of propagation of the light beam.

According to another particular feature, the absolute value of the ratio of the vergence of the diverging lens to the vergence of the fixed converging lens is in the range from 0.001 to 0.1.

According to a second embodiment:

the fixed lens corresponds to a fixed diverging lens, and the movable optical element comprises at least one first prism configured to rotate about at least one first axis of rotation passing through the centre of two opposite faces of the first prism.

Moreover, the first prism is configured to rotate about another axis of rotation approximately perpendicular to the axis of rotation.

According to one variant, the movable optical element further comprises at least one second prism configured to rotate about a second axis of rotation passing through the centre of two opposite faces of the second prism, the first axis of rotation and the second axis of rotation being approximately perpendicular to the direction of propagation of the light beam.

Furthermore, the displacement unit is able to rotate the first prism and/or the second prism about their respective axis of rotation.

In a variant, the first prism and/or the second prism are plane-parallel plates.

Moreover, the plane-parallel plates have a thickness in the range from 5 mm to 20 mm.

Besides, the index of the plane-parallel plates is in the range from 1.4 to 1.8.

Furthermore, the inclination angle of the plane-parallel plates is in the range from 10° to 30°.

The invention also relates to a system for adjustment of a direction of propagation of a light beam.

The system comprises:

a light source able to emit a light beam along an optical axis, and an optical beam device, as described above, arranged downstream from the light source in the direction of propagation of the light beam.

According to a variant embodiment, the optical device corresponds to an expander.

According to another variant embodiment, the optical device corresponds to a collimator.

Moreover, the system comprises a user unit able to transmit signals representing a set direction of propagation of the light beam at the output of the optical device to the displacement unit, said displacement unit being able to displace the diverging lens or the prism or prisms as a function of the signals that have been transmitted to it by the user unit.

For example, the user unit corresponds to a stabilizing unit configured for sending signals of a set direction of propagation of the light beam at the output of the optical device based on commands to the displacement unit as a function of a difference between the direction of propagation of the light beam at the input of the optical device and a target axis corresponding to the set direction of propagation of the light beam at the output of the optical device.

BRIEF DESCRIPTION OF THE FIGURES

The invention, with its features and advantages, will become clearer on reading the description, which refers to the appended drawings, in which.

DETAILED DESCRIPTION

The rest of the description will refer to the figures mentioned above.

The invention relates to an optical device D able to change the direction of propagation of a light beam 7.

Thus, the optical device D allows a light beam that has one direction of propagation at the input of the optical device to have another direction of propagation at the output of the optical device D that corresponds to a set direction of propagation.

The optical device D may be a light beam expander or a light beam collimator having a telephoto architecture.

The light beam 7 may be a directional light beam; notably a laser beam. The light beam 7 may exit a light source 3 in a direction of propagation z.

Figure 1:
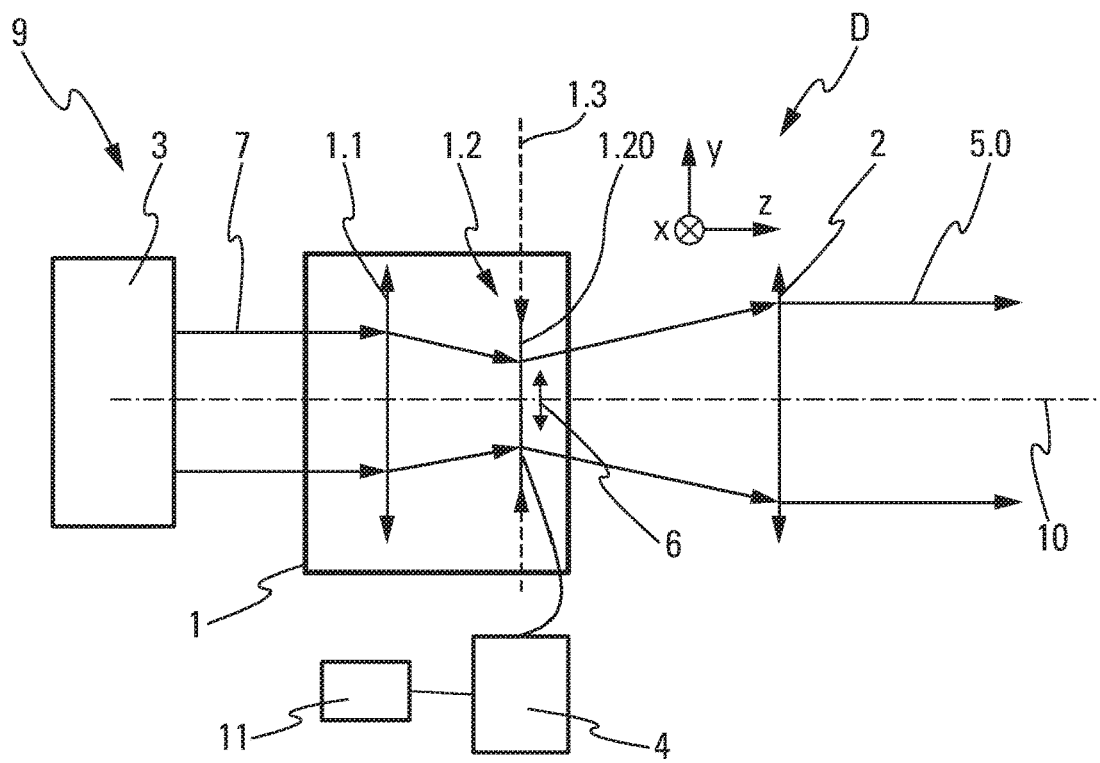
FIG. 1 shows a first embodiment of an optical device in a given position of the diverging lens.
Figure 4:
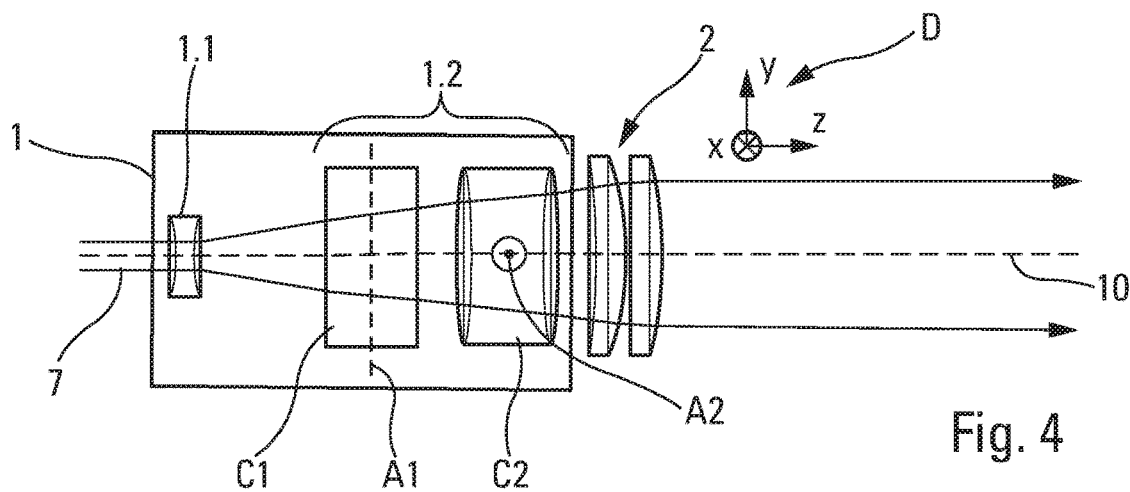
FIG. 4 shows the optical device according to the second embodiment in a given position of the prisms.

As illustrated in FIG. 1 and in FIG. 4, the optical device D comprises, in the direction of propagation z of the light beam 7 from upstream to downstream, an overall divergent group of lenses 1 and an overall convergent group of lenses 2.

For example, the overall convergent group of lenses 2 comprises one or more lenses which form an optical unit. This optical unit is equivalent to a converging lens.

While non-limiting, the overall convergent group of lenses 2 has a vergence in the range from $1\delta$ to $100\delta$.

The overall divergent group of lenses 1 contains, in the direction of propagation z of the light beam 7:

a fixed lens 1.1, and an optical module comprising at least one movable optical element 1.2 able to change the direction of propagation of the light beam emerging from the overall divergent group of lenses 1.

The movable optical element is configured to be displaced as a function of a set direction of propagation of the light beam at the output of the optical device D. The displacement of the optical element allows the direction of the light beam at the output of the optical device D to correspond to the set direction of propagation.

The optical module may further comprise a displacement unit 4, 12 configured to displace the movable optical element 1.2 as a function of signals representing the set direction of propagation of the light beam at the output of the optical device D.

According to a first embodiment (FIGS. 1 and 2), the fixed lens 1.1 corresponds to a fixed converging lens and the movable optical element 1.2 comprises a diverging lens 1.20 that can be displaced in a plane 1.3 approximately perpendicular to the direction of propagation z of the light beam 7. The two lenses 1.1 and 1.20 form an optical unit equivalent to a diverging lens.

The diverging lens 1.20 of the overall divergent group of lenses 1 may be displaced in a plane 1.3 perpendicular to the direction of propagation z of the light beam, as illustrated by a double arrow 6 in FIG. 1. An x, y, z coordinate system is shown in FIG. 1. In this coordinate system the direction of propagation of the light beam 7 is along the z axis. The plane 1.3 perpendicular to the direction of propagation of the light beam 7 is located in a plane parallel to the x and y axes.

The displacement of the diverging lens 1.20 may be effected by the displacement unit 4. This displacement unit 4 is able to displace the diverging lens 1.20 in the plane 1.3 perpendicular to the direction of propagation z of the light beam 7.

As an example, the displacement unit 4 comprises a plate supporting the diverging lens 1.20. The plate is moved by a motorized system allowing the plate to be displaced in the two directions x and y.

Figure 2:
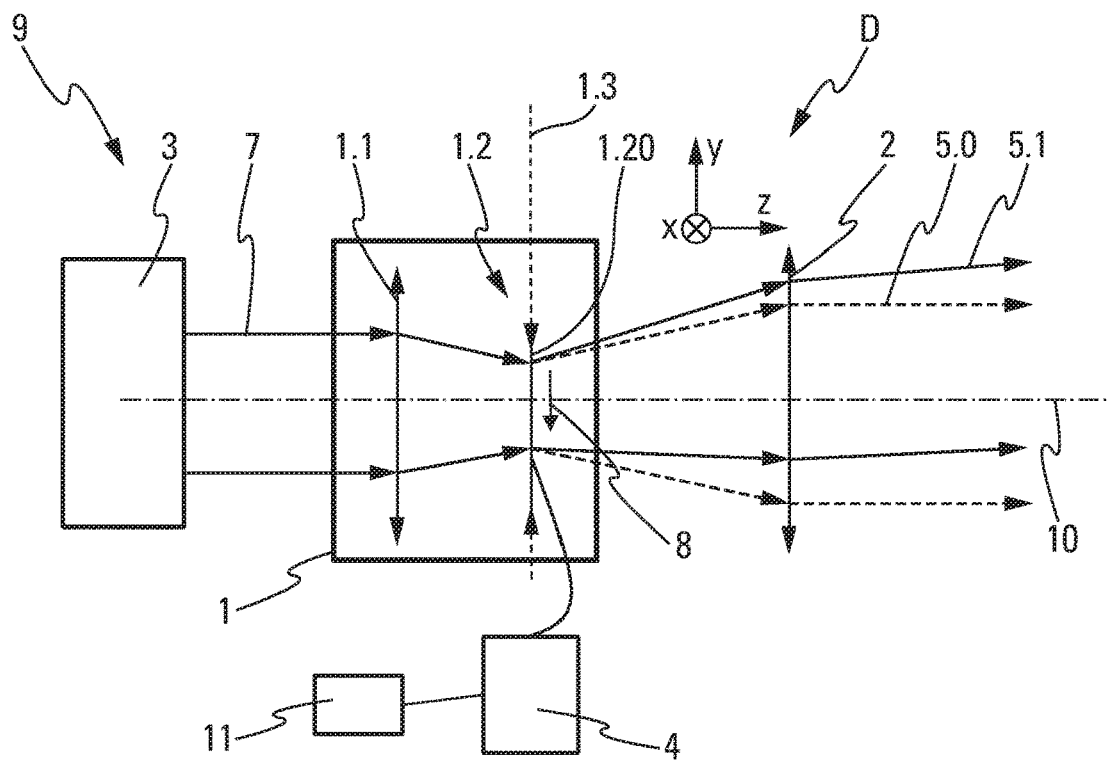
FIG. 2 shows the optical device according to the first embodiment in another position of the diverging lens.

Thus, as shown in FIG. 2, when the diverging lens 1.20 is displaced in the plane perpendicular to the direction of propagation of the light beam 7, the direction of the beam leaving the optical device D is changed. FIG. 2 shows the light beam 5.0 after the optical device D according to a first position of the diverging lens 1.20 and the light beam 5.1 after the optical device D after a displacement 8 of the diverging lens 1.20 (in the direction indicated by arrow 8 in FIG. 2) according to a second position of the diverging lens 1.20.

The diverging lens 1.20 has a high vergence.

While non-limiting, the absolute value of the ratio of the vergence of the diverging lens 1.20 to the vergence of the converging lens 1.1 is in the range from 0.001 to 0.1.

Thus, the vergence of the converging lens 1.1 makes it possible to increase the absolute value of the vergence of the diverging lens to reduce the need for displacements.

In a variant embodiment, the converging lens 1.1 may be replaced with an overall convergent group of lenses. The diverging lens 1.20 may also be replaced with an overall divergent group of lenses.

Figure 3:
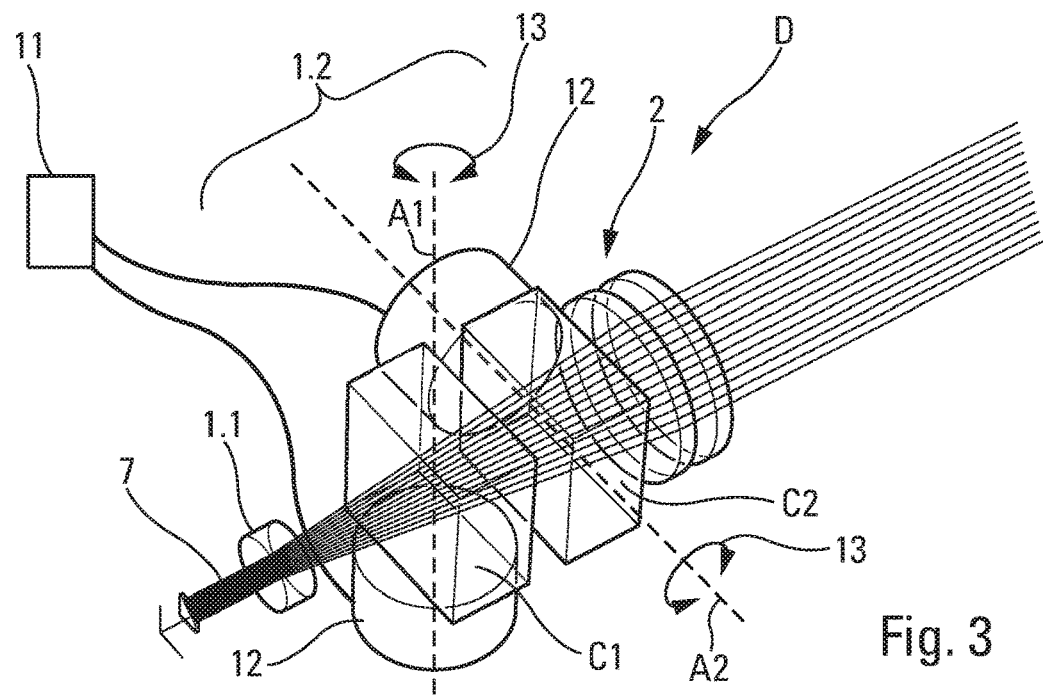
FIG. 3 shows a perspective view of a second embodiment of an optical device.

According to a second embodiment (FIGS. 3 to 5), the fixed lens 1.1 corresponds to a fixed diverging lens. Moreover, the movable optical element 1.2 comprises at least one prism C1 configured to rotate about at least one axis of rotation A1 passing through the centre of two opposite faces of the prism C1.

The axis of rotation A1 is approximately perpendicular to the direction of propagation z of the light beam 7.

The prism C1 may be configured to rotate about another axis of rotation approximately perpendicular to the axis of rotation A1 and in the direction of propagation z of the light beam 7.

According to one variant, the movable optical element 1.2 further comprises at least one prism C2 configured to rotate about an axis of rotation A2 passing through the centre of two opposite faces of the prism C2.

The axis of rotation A2 is approximately perpendicular to the direction of propagation z of the light beam 7.

Preferably, the axis of rotation A1 is approximately perpendicular to the axis of rotation A2.

Preferably, the prisms C1 and C2 are of cubic shape.

The prisms may consist of cut glass.

The prisms C1 and/or C2 may be plane-parallel plates. The plane-parallel plates can have a thickness in the range from 5 mm to 20 mm. Their index can be in the range from 1.4 and 1.8.

The plane-parallel plates can rotate about their axis of rotation A1 and A2 so that they have an absolute value of maximum inclination angle that can be in the range from 10° to 30°. Preferably, the absolute value of maximum inclination angle can be in the range from 20° to 30°. According to a variant, the inclination angle corresponds to the angle between the surfaces of the plane-parallel plates and a plane perpendicular to the light beam direction of propagation z (at the input of the optical device D). According to another variant, the inclination angle corresponds to the angle between the surfaces of the plane-parallel plates and the light beam direction of propagation z (at the input of the optical device D).

Figure 5:
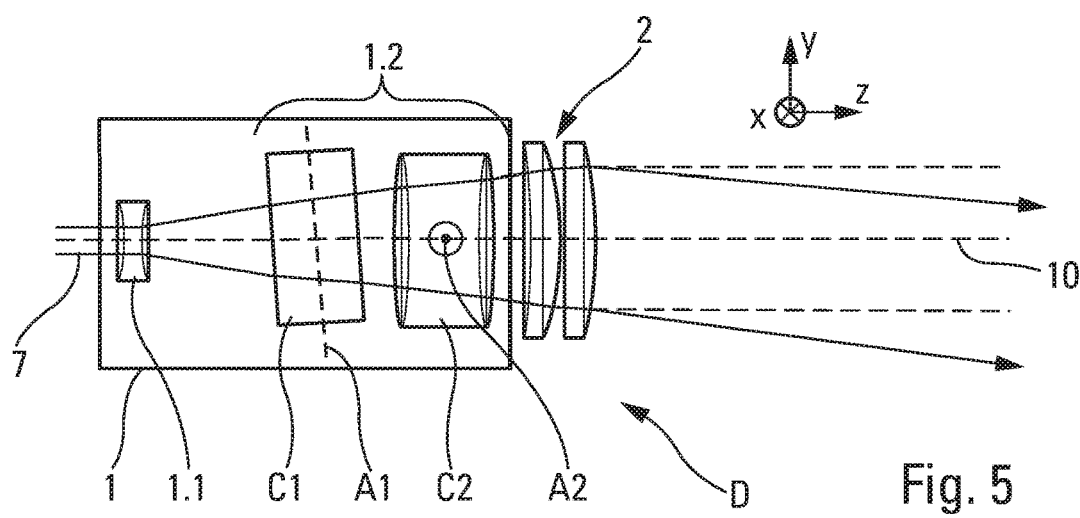
FIG. 5 shows the optical device according to the second embodiment in another position of the prisms.

An x, y, z coordinate system is shown in FIGS. 4 and 5. In these figures, the axis of rotation A1 is parallel to the y axis and the axis of rotation A2 is parallel to the x axis. The direction of propagation z of the light beam at the input of the optical device D is parallel to the z axis.

Moreover, the displacement unit 12 is able to rotate the prism C1 and/or the prism C2 about their respective axis of rotation A1, A2.

As an example, the displacement unit 12 comprises a plate for each prism C1, C2, respectively. Each plate is moved by a motorized system by which each of the prisms C1 and C2 is rotated. The arrows 13 in FIG. 3 indicate the rotation performed by the prisms C1 and C2 driven by the plates of the displacement unit 12.

In a variant embodiment, the diverging lens 1.1 may be replaced with an overall divergent group of lenses.

The optical device D according to the invention provides wide ranges of adjustment of the direction of a light beam even though it has very small mechanical movements. This therefore makes it possible to obtain very small devices and very compact systems.

Moreover, this optical device D makes it possible to dissociate the adjustment of the direction of the light beam from the light source 3. The light source 3 does not need to be displaced to adjust the direction of the light beam. For example, this avoids the use of bulky displacement systems when a high-power laser is used.

The optical device D may be used in a system 9 for adjusting a direction of propagation z of a light beam.

Said system comprises a light source 3 capable of emitting a light beam 7 along an optical axis 10.

The optical device D is arranged downstream from the light source 3 in the direction of propagation of the light beam 7.

According to a preferred embodiment, the system 9 further comprises a user unit 11 able to transmit the signals representing a set direction of propagation of the light beam at the output of the optical device D to the displacement unit 4. The displacement unit 4 can then displace the diverging lens 1.20 or the prism or prisms C1 and/or C2 as a function of the signals that have been transmitted to it by the user unit 11.

As an example, the user unit 11 corresponds to a control unit comprising a unit for detecting a target or a unit for detecting movement of the system.

The user unit 11 may correspond to a stabilizing unit configured for sending command signals of a set direction of propagation of the light beam at the output of the optical device D based on commands to the displacement unit 12 as a function of a difference between the direction of propagation of the light beam 7 at the input of the optical device D and a target axis corresponding to the set direction of propagation of the light beam at the output of the optical device D. Thus, owing to the optical device D, it is possible to point accurately at a target with a laser beam with the system, which can be portable without having recourse to a support, such as a tripod.

The present description gives details of various embodiments referring to figures and/or technical features. A person skilled in the art will understand that the various technical features of the various embodiments may be combined with one another to obtain other embodiments, unless the opposite is explicitly mentioned or these technical features are incompatible. Moreover, a technical feature of an embodiment may be isolated from the other technical features of this embodiment unless the opposite is mentioned. In the present description, many specific details are supplied for purposes of illustration and not in any way limiting, so as to describe the invention accurately. A person skilled in the art will understand, however, that the invention can be carried out in the absence of one or more of these specific details or with variants. On other occasions, certain aspects are not described in detail so as to avoid obscuring and increasing the size of the present description and a person skilled in the art will understand that very varied means can be used and that the invention is not limited just to the examples described.

It must be evident to skilled persons that the present invention allows embodiments in many other specific forms while remaining within the field of application of the invention as claimed. Consequently, the present embodiments must be regarded as illustrations, but may be modified in the range defined by the scope of the accompanying claims, and the invention must not be limited to the details given above.

The embodiments of the invention in which an exclusive property or privilege is claimed are defined as follows:

1. An optical device able to change the direction of propagation of a light beam, comprising:
   in the direction of propagation of the light beam, an overall divergent group of lenses and an overall convergent group of lenses,
   wherein the overall divergent group of lenses includes, in the direction of propagation of the light beam:
   a fixed lens, and
   an optical module comprising at least one movable optical element able to change the direction of propagation of the light beam emerging from the overall divergent group of lenses.

2. The device according to claim 1, wherein the optical module comprises a displacement unit configured to displace the movable optical element as a function of signals representing a set direction of propagation of the light beam at the output of the optical device.

3. The device according to claim 2, wherein the displacement unit is able to displace the diverging lens in the plane perpendicular to the direction of propagation of the light beam.

4. The device according to claim 1, wherein:
the fixed lens corresponds to a fixed converging lens, and
the movable optical element comprises a diverging lens that can be displaced in a plane approximately perpendicular to the direction of propagation of the light beam.

5. The device according to claim 4, wherein an absolute value of a ratio of a vergence of the diverging lens to a vergence of the fixed converging lens is in a range from 0.001 to 0.1.

6. The device according to claim 1, wherein:
the fixed lens corresponds to a fixed diverging lens, and
the movable optical element comprises at least one first prism configured to rotate about at least one first axis of rotation passing through the centre of two opposite faces of the first prism.

7. The device according to claim 6, wherein the first prism is configured to rotate about another axis of rotation approximately perpendicular to the axis of rotation.

8. The device according to claim 6, wherein the movable optical element further comprises at least one second prism configured to rotate about a second axis of rotation passing through the centre of two opposite faces of the second prism, the first axis of rotation and the second axis of rotation being approximately perpendicular to the direction of propagation of the light beam.

9. The device according to claim 6, wherein the displacement unit is able to rotate the first prism and/or the second prism about their respective axis of rotation.

10. The device according to claim 6, wherein the first prism and/or the second prism are plane-parallel plates.

11. The device according to claim 10, wherein the plane-parallel plates have a thickness in the range from 5 mm to 20 mm.

12. The device according to claim 10, wherein the plane-parallel plates have an index in the range from 1.4 to 1.8.

13. The device according to claim 10, wherein the plane-parallel plates can rotate so that they have a maximum absolute value of inclination angle in the range from 10° to 30°.

14. A system for adjusting a direction of propagation of a light beam, comprising:
a light source able to emit a light beam along an optical axis; and
arranged downstream from the light source in the direction of propagation of the light beam, an optical device comprising, in the direction of propagation of the light beam, an overall divergent group of lenses and an overall convergent group of lenses,
wherein the overall divergent group of lenses includes, in the direction of propagation of the light beam:
a fixed lens, and
an optical module comprising at least one movable optical element able to change the direction of propagation of the light beam emerging from the overall divergent group of lenses.

15. The system according to claim 14, wherein the optical device corresponds to an expander.

16. The system according to claim 14, wherein the optical device corresponds to a collimator.

17. The system according to claim 14, further comprising a user unit able to transmit signals representing a set direction of propagation of the light beam at the output of the optical device to the displacement unit, said displacement unit able to displace the diverging lens or one or more prisms as a function of the signals that have been transmitted to it by the user unit.

18. The system according to claim 17, wherein the user unit corresponds to a stabilizing unit configured for sending signals of a set direction of propagation of the light beam at the output of the optical device based on commands to the displacement unit as a function of a difference between the direction of propagation of the light beam at the input of the optical device and a target axis corresponding to the set direction of propagation of the light beam at the output of the optical device.

* * * * *